US007945636B2

(12) United States Patent
Nelson et al.

(10) Patent No.: US 7,945,636 B2
(45) Date of Patent: May 17, 2011

(54) PROVIDING A MULTI-TIER ENTERPRISE LEVEL APPLICATION

(75) Inventors: Hortense Kathleen Nelson, Blackfoot, ID (US); Michael Dee Landon, Idaho Falls, ID (US); Robert H. Powell, Idaho Falls, ID (US); Gary Dean Smylie, Idaho Falls, ID (US)

(73) Assignee: In-Store Broadcasting Network, LLC, Salt Lake City, UT (US)

( * ) Notice: Subject to any disclaimer, the term of this patent is extended or adjusted under 35 U.S.C. 154(b) by 0 days.

(21) Appl. No.: 10/146,192

(22) Filed: May 15, 2002

(65) Prior Publication Data

US 2003/0217170 A1    Nov. 20, 2003

(51) Int. Cl.
*G06F 15/16* (2006.01)
(52) U.S. Cl. ........ 709/217; 709/203; 709/225; 709/229; 709/231; 709/232; 709/248
(58) Field of Classification Search .................. 709/203, 709/217, 219, 226, 231, 201, 246, 225, 232, 709/248; 705/14; 707/104.1
See application file for complete search history.

(56) References Cited

U.S. PATENT DOCUMENTS

| | | | | |
|---|---|---|---|---|
| 3,714,575 A * | 1/1973 | Rogalski | ...................... | 455/526 |
| 4,130,801 A | 12/1978 | Prygoff | ............................ | 325/4 |
| 5,408,686 A | 4/1995 | Mankovitz | ...................... | 455/66 |
| 5,515,508 A * | 5/1996 | Pettus et al. | ................. | 709/203 |
| 5,636,276 A | 6/1997 | Brugger | ............................ | 380/4 |
| 5,644,720 A * | 7/1997 | Boll et al. | ..................... | 709/227 |
| 5,682,534 A * | 10/1997 | Kapoor et al. | ................ | 719/328 |
| 5,913,040 A * | 6/1999 | Rakavy et al. | ................ | 709/232 |
| 5,931,901 A | 8/1999 | Wolfe et al. | ................... | 709/206 |
| 5,949,411 A * | 9/1999 | Doerr et al. | ................... | 715/716 |
| 5,960,200 A * | 9/1999 | Eager et al. | ................... | 717/147 |
| 5,983,005 A * | 11/1999 | Monteiro et al. | ............. | 709/231 |
| 5,991,374 A | 11/1999 | Hazenfield | ............... | 379/101.01 |
| 6,006,265 A * | 12/1999 | Rangan et al. | ................ | 709/226 |
| 6,009,409 A * | 12/1999 | Adler et al. | ..................... | 705/14 |
| 6,032,130 A * | 2/2000 | Alloul et al. | .................... | 705/27 |
| 6,038,590 A * | 3/2000 | Gish | ............................ | 709/203 |
| 6,044,403 A * | 3/2000 | Gerszberg et al. | ............ | 709/225 |
| 6,088,722 A * | 7/2000 | Herz et al. | ..................... | 709/217 |
| 6,112,192 A * | 8/2000 | Capek | ............................. | 705/59 |
| 6,161,142 A | 12/2000 | Wolfe et al. | ................... | 709/230 |
| 6,192,340 B1 * | 2/2001 | Abecassis | ..................... | 704/270 |
| 6,195,694 B1 * | 2/2001 | Chen et al. | .................... | 709/220 |
| RE37,131 E | 4/2001 | Mankovitz | ...................... | 455/66 |
| 6,286,029 B1 * | 9/2001 | Delph | ............................ | 709/203 |
| 6,311,214 B1 * | 10/2001 | Rhoads | ........................ | 709/217 |

(Continued)

*Primary Examiner* — Michael Won
(74) *Attorney, Agent, or Firm* — Kirton & McConkie; Michael F. Krieger (57) ABSTRACT

Systems and methods for providing a multi-tier enterprise level application. In particular, the present invention relates to systems and methods for providing an architecture and interface for delivering customizable music and advertisements to remote retail locations. A client player computer device is located at the retail location and a server system is located at a remote location. The server system selectively provides broadcast information when an active contract, an active advertisement, and an active schedule are available. The client player computer device establishes a contact with a server at a predetermined time or upon request by the server or another source. The client player computer device executes a broadcast or program schedule that includes music content and advertisements, wherein the advertisements have been purchased as blocks of time by entities and are scheduled to be broadcast at particular times. The music content and advertisements are selectively customizable to provide a dynamic service at the retail location.

3 Claims, 8 Drawing Sheets

U.S. PATENT DOCUMENTS

| | | | |
|---|---|---|---|
| 6,317,795 B1 * | 11/2001 | Malkin et al. | 709/246 |
| 6,335,694 B1 | 1/2002 | Beksa et al. | 340/945 |
| 6,366,914 B1 | 4/2002 | Stern | 707/10 |
| 6,408,307 B1 | 6/2002 | Semple et al. | 707/104.1 |
| 6,434,621 B1 * | 8/2002 | Pezzillo et al. | 709/231 |
| 6,460,040 B1 * | 10/2002 | Burns | 707/10 |
| 6,484,148 B1 | 11/2002 | Boyd | 705/14 |
| 6,487,583 B1 * | 11/2002 | Harvey et al. | 709/204 |
| 6,505,160 B1 | 1/2003 | Levy et al. | 704/270 |
| 6,507,764 B1 | 1/2003 | Parrella et al. | 700/94 |
| 6,513,069 B1 * | 1/2003 | Abato et al. | 709/238 |
| 6,539,429 B2 * | 3/2003 | Rakavy et al. | 709/224 |
| 6,553,404 B2 | 4/2003 | Stern | 709/203 |
| 6,587,127 B1 | 7/2003 | Leeke et al. | 345/765 |
| 6,591,247 B2 * | 7/2003 | Stern | 705/14 |
| 6,647,389 B1 * | 11/2003 | Fitch et al. | 707/10 |
| 6,647,417 B1 * | 11/2003 | Hunter et al. | 709/225 |
| 6,658,418 B2 * | 12/2003 | Burns | 707/10 |
| 6,728,750 B1 * | 4/2004 | Anderson et al. | 709/201 |
| 6,748,508 B1 * | 6/2004 | Khandelwal et al. | 711/170 |
| 6,760,916 B2 * | 7/2004 | Holtz et al. | 725/34 |
| 6,785,704 B1 * | 8/2004 | McCanne | 718/105 |
| 6,799,201 B1 * | 9/2004 | Lee et al. | 709/217 |
| 6,847,974 B2 * | 1/2005 | Wachtel | 707/101 |
| 6,910,220 B2 * | 6/2005 | Hickey et al. | 725/39 |
| 6,920,479 B2 * | 7/2005 | McDowall et al. | 709/203 |
| 6,944,680 B1 * | 9/2005 | Lee et al. | 709/249 |
| 7,028,306 B2 * | 4/2006 | Boloker et al. | 719/310 |
| 7,136,906 B2 * | 11/2006 | Giacalone, Jr. | 709/218 |
| 7,631,327 B2 * | 12/2009 | Dempski et al. | 725/34 |
| 7,668,936 B1 * | 2/2010 | Krikorian et al. | 709/219 |
| 2001/0034763 A1 * | 10/2001 | Jacobs et al. | 709/204 |
| 2001/0042109 A1 * | 11/2001 | Bolas et al. | 709/219 |
| 2001/0052001 A1 | 12/2001 | Stern | 709/219 |
| 2002/0019769 A1 * | 2/2002 | Barritz et al. | 705/14 |
| 2002/0049635 A1 | 4/2002 | Mai et al. | 705/14 |
| 2002/0072974 A1 * | 6/2002 | Pugliese et al. | 705/14 |
| 2002/0083006 A1 | 6/2002 | Headings et al. | 705/14 |
| 2002/0087402 A1 * | 7/2002 | Zustak et al. | 705/14 |
| 2002/0103811 A1 * | 8/2002 | Fankhauser et al. | 707/104.1 |
| 2002/0124251 A1 | 9/2002 | Hunter et al. | 725/32 |
| 2002/0194388 A1 * | 12/2002 | Boloker et al. | 709/310 |
| 2003/0041045 A1 | 2/2003 | Sun | 707/1 |
| 2003/0050997 A1 | 3/2003 | Hickey et al. | 709/217 |
| 2003/0061607 A1 | 3/2003 | Hunter et al. | 725/32 |
| 2003/0088421 A1 * | 5/2003 | Maes et al. | 704/270.1 |
| 2003/0120541 A1 | 6/2003 | Siann et al. | 705/14 |
| 2003/0126146 A1 | 7/2003 | Van Der Riet | 707/100 |
| 2003/0145305 A1 * | 7/2003 | Ruggier | 717/100 |
| 2003/0216958 A1 * | 11/2003 | Register et al. | 705/14 |
| 2006/0031421 A1 * | 2/2006 | Hayakawa | 709/219 |

* cited by examiner

PROVIDING A MULTI-TIER ENTERPRISE LEVEL APPLICATION

BACKGROUND OF THE INVENTION

1. Field of the Invention

The present invention relates to systems and methods for providing a multi-tier enterprise level application. In particular, the present invention relates to systems and methods for providing an architecture and interface for delivering customizable music and advertisements to remote retail locations.

2. Background and Related Art

The emergence of the personal computer has provided a variety of computer system configurations. One such configuration is a client/server system, wherein the user interface runs on the client and the database is at the server. Such systems are typically two-tier configurations, wherein the business logic is performed at the clients and shared data is updated by sending streams of structured query language ("SQL") to the server. The clients are modified to reflect new rules and conditions without modifying the server, as long as the server has access to the database (e.g., tables, views, etc.) used to perform the transactions. Commonly, the server of a two-tier configuration is referred to as a database server.

Problems currently exist with database servers. For example, the SQL corresponding to a business function is typically identical from call to call, with the exception of the data being updated or inserted. Accordingly, a database server spends valuable processing time parsing and re-parsing nearly identical SQL statements for each business function. Further, when a client or server falls behind on a software version, it typically must be shut down while it is being upgraded.

Another type of available architecture is an application server. In an application server environment business methods are run over the server and the client requests the server to execute the methods. Accordingly, the client and server typically use a protocol that represents a conversation at the level of business transactions instead of at the level of tables and rows. Accordingly, application servers often perform better than their database counterparts, but still suffer from problems with versioning.

Attempts have been made to enhance database and application systems by adding additional tiers to the architecture that place an intermediate component between the client and the server. One such attempt relates to a technique known as Enterprise Java Beans, which provides a framework for components that may be plugged into a server to extend the server's functionality. An Enterprise Java Bean client/server system configuration typically includes an Enterprise Java Bean component, container, object, and remote interface. An Enterprise Java Bean component executes within an Enterprise Java Bean container that in turn executes within an Enterprise Java Bean server. Client programs execute methods on remote enterprise Java Beans by way of an Enterprise Java Bean object. The object implements the remote interface of the Enterprise Java Bean component on the server. The remote interface represents the business methods for the Enterprise Java Bean component.

Implementation of an Enterprise Java Bean object is created by a co-generation tool that comes with the Enterprise Java Bean container. The object's interface is the remote interface of the Enterprise Java Bean component. The object (created by the container and tools associated with the container) and the Enterprise Java Bean component (created by the developer) implement the same remote interface. When the client calls a method on an Enterprise Java Bean object, the object method communicates with the remote Enterprise Java Bean container, requesting that the appropriate remote Enterprise Java Bean call the same method with the same arguments on the client's behalf.

Two types of Enterprise Java Beans currently exist, namely Session Beans and Entity Beans. Session Beans are typically not persistent and may not participate in transactions. An Entity Bean represents information persistently stored on a database. Entity Beans are associated with database transactions, provide data access to multiple users, and correspond to business objects that are typically mapped to one or more tables in a database. Since the data of an Entity Bean is persistently stored on a database, the Entity Beans survive server crashes.

While Enterprise Java Beans assist in avoiding the need to write and manage SQL statements by using container managed persistence, the use of the Enterprise Java Beans can prove to be complicated. For example, if an SQL needs to be changed, a developer may have to make the modification in a large complicated file. Thus, while techniques currently exist that are used to provide for multi-tier system configurations, challenges exist with the current techniques. Accordingly, it would be an improvement in the art to augment or even replace current techniques with other techniques to provide multi-tier system configurations.

SUMMARY OF THE INVENTION

The present invention relates to systems and methods for providing a multi-tier enterprise level application. In particular, the present invention relates to systems and methods for providing an architecture and interface for delivering customizable music and advertisements to remote retail locations.

Implementation of the present invention takes place in association with a computer system that is configured to utilize one or more interface layers between a presentation layer and a data layer to provide a multi-tier enterprise level application. In one implementation, the enterprise level application selectively delivers customizable music and advertisements to a remote retail location.

A system manager oversees management of a server system, which includes a variety of resources that may be provided to one or more remote client player devices. The resources may include, for example, music and advertisements/announcements that are scheduled for broadcast at the client player devices. The client player devices are each located in a retail location and may be grouped according to retail chains or any other common characteristic between the retail locations, the content broadcast, etc. Optionally, a chain manager oversees or manages the content that is broadcast at a particular group of client player devices. The content may be customized to particular retail chains/groupings, to neighborhood environments, business types, etc.

Implementation of the multi-tier enterprise level application takes place in association with the use of Persistent and JIMPersistent ("Java Instance Manager") Beans, which do not require the use of an application server and facilitate multi-tier applications. Further, implementation of the present invention reduces the difficulty that is associated with designing, coding, and maintaining complex applications. Persistent Beans assist in the creation and management of business objects without the overhead of Enterprise Java Beans, and interact with databases through the use of a peer class that is responsible for creating, restoring, updating, and deleting an object in a particular database. JIMPersistent Beans add additional functionality, allowing greater control over the distribution and modification of the entities. For example, in one implementation many different objects look at the same instance of an entity, and if that entity is modified then all of the objects that are using that entity are notified of the change.

While the methods and processes of the present invention have proven to be particularly useful in the area of providing a software architecture and interface for delivering customizable music and advertisements to remote retail locations, those skilled in the art will appreciate that the methods and processes may be used in a variety of different applications to yield multi-tier enterprise level applications.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to systems and methods for providing a multi-tier enterprise level application. In particular, the present invention relates to systems and methods for providing an architecture and interface for delivering customizable music and advertisements to remote retail locations.

The following disclosure of the present invention is grouped into three subheadings, namely "Exemplary Operating Environment," "Providing a Multi-Tier Enterprise Level Application," and "Representative Interface Layers of the Application." The utilization of the subheadings is for convenience of the reader only and is not to be construed as limiting in any sense.

Exemplary Operating Environment

Embodiments of the present invention takes place in association with one or more computer devices that are configured to utilize one or more interface layers between a presentation layer and a data layer to provide a multi-tier enterprise level application. Accordingly, FIGS. 1 and 2, and the corresponding discussion, are intended to provide a general description of a suitable operating environment in which the invention may be implemented. One skilled in the art will appreciate that the invention may be practiced by one or more computing devices and in a variety of networked configurations.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Figure 1:
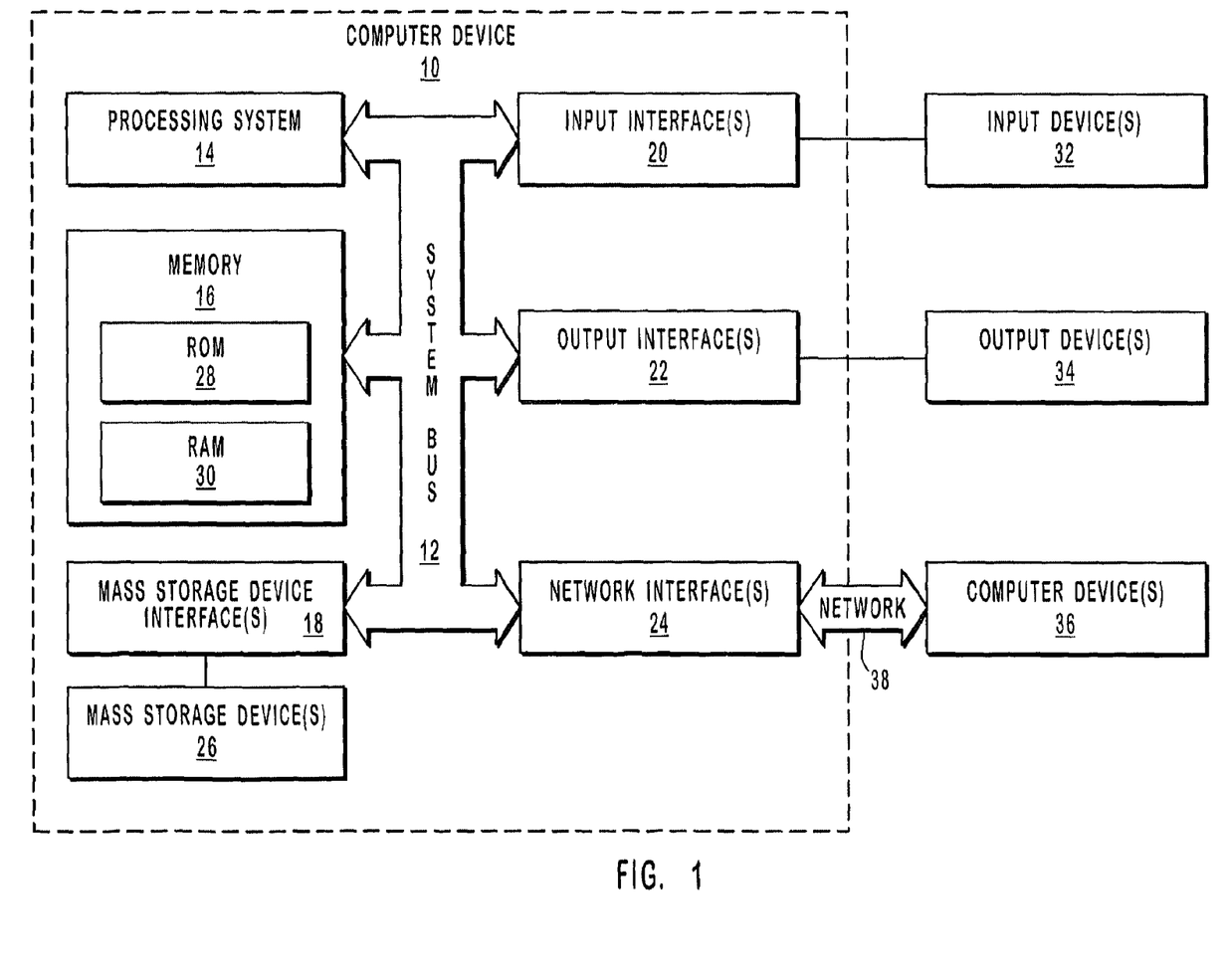
FIG. 1 illustrates a representative computer device for use in association with embodiments of the present invention.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
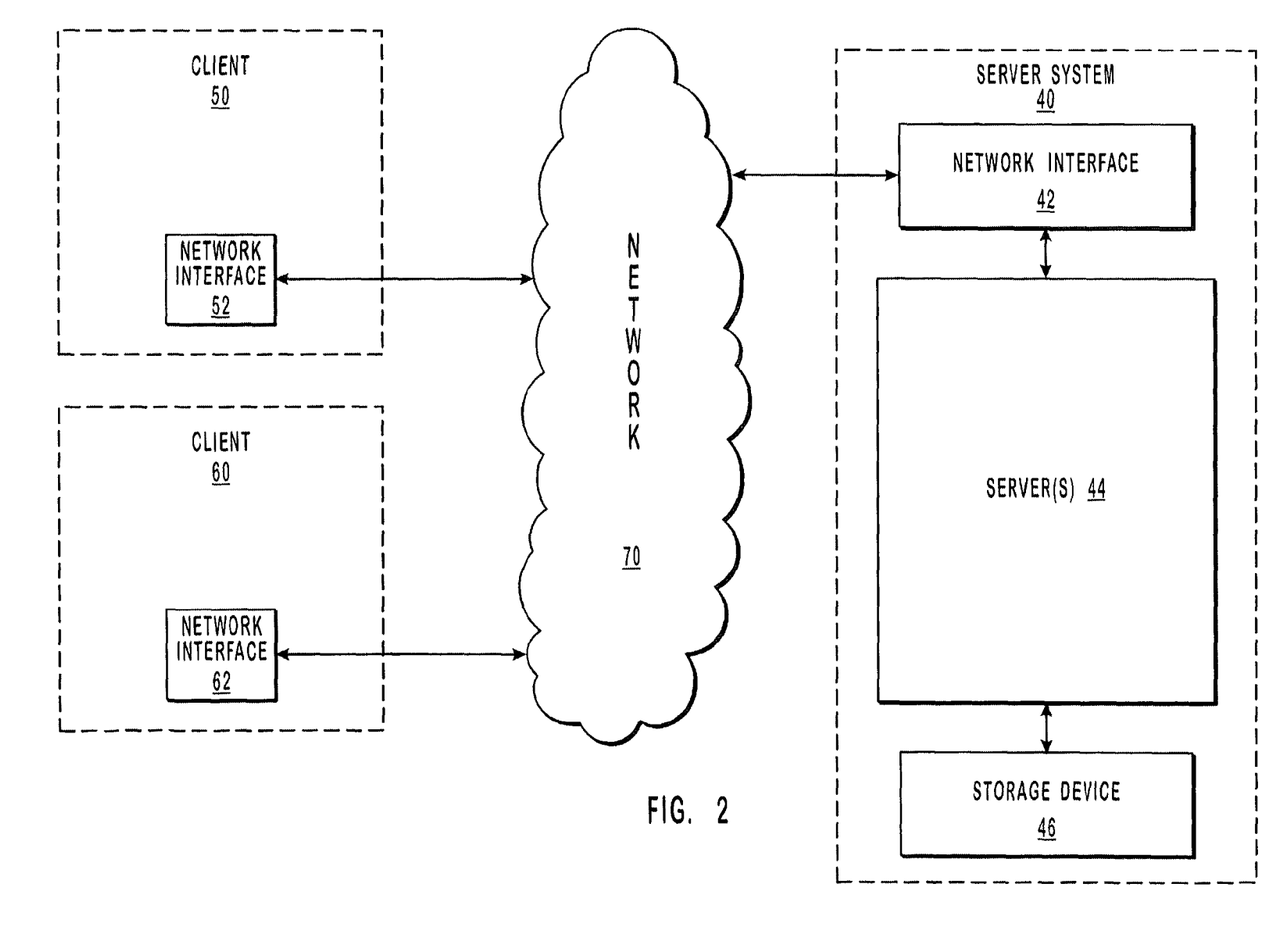
FIG. 2 illustrates a representative system that provides a suitable operating environment for embodiments of the present invention.

While those skilled in the art will appreciate that embodiments of the present invention may be practiced in network computing environments with many types of computer system configurations to provide a multi-tier enterprise level application, FIG. 2 provides a representative configuration that includes two clients connected to a server system. Those skilled in the art will appreciate that alternative embodiments include one client connected to a server system or more than two clients connected to a server system. Moreover, embodiments in accordance with the present invention also include a multitude of clients throughout the world connected to a network, where the network is a wide area network, such as the Internet. Further, the server system may include a single server in cases where a single server can process and preserve the entire amount of information required to perform the methods of the present invention that are disclosed herein. Alternatively, the server system may be a conglomeration of servers that process and preserve a high volume of information.

In FIG. 2, a computer system configuration is illustrated that includes server system 40 connected to clients 50 and 60 via a network 70. Those skilled in the art will appreciate that network 70 may include a wide area network (e.g., the internet), a local area network, a leased line connection, a wireless network, a dial up connection, and/or any other type of connection that enables information to be exchanged between server system 40 and clients 50 and 60.

Server system 40, client 50, and client 60 each include a network interface (respectively illustrated as network interfaces 42, 52, and 62) that enables information to be exchanged or communicated. Server system 44 also includes one or more servers that selectively manage data, which is preserved at and/or obtained from a storage device 46.

As will be discussed below, embodiments of the present invention embrace the use of an interface layer between a presentation layer and a data layer in a multi-tier enterprise level application. The following provides a representative example of a multi-tier enterprise level application that includes systems and methods for providing an architecture and interface for delivering customizable music and advertisements to remote retail locations. While the methods and processes of the present invention have proven to be particularly useful in the area of providing a software architecture and interface for delivering customizable music and advertisements to remote retail locations, those skilled in the art will appreciate that the methods and processes may be used in a variety of different applications to yield multi-tier enterprise level applications.

Providing a Multi-Tier Enterprise Level Application

Figure 3:
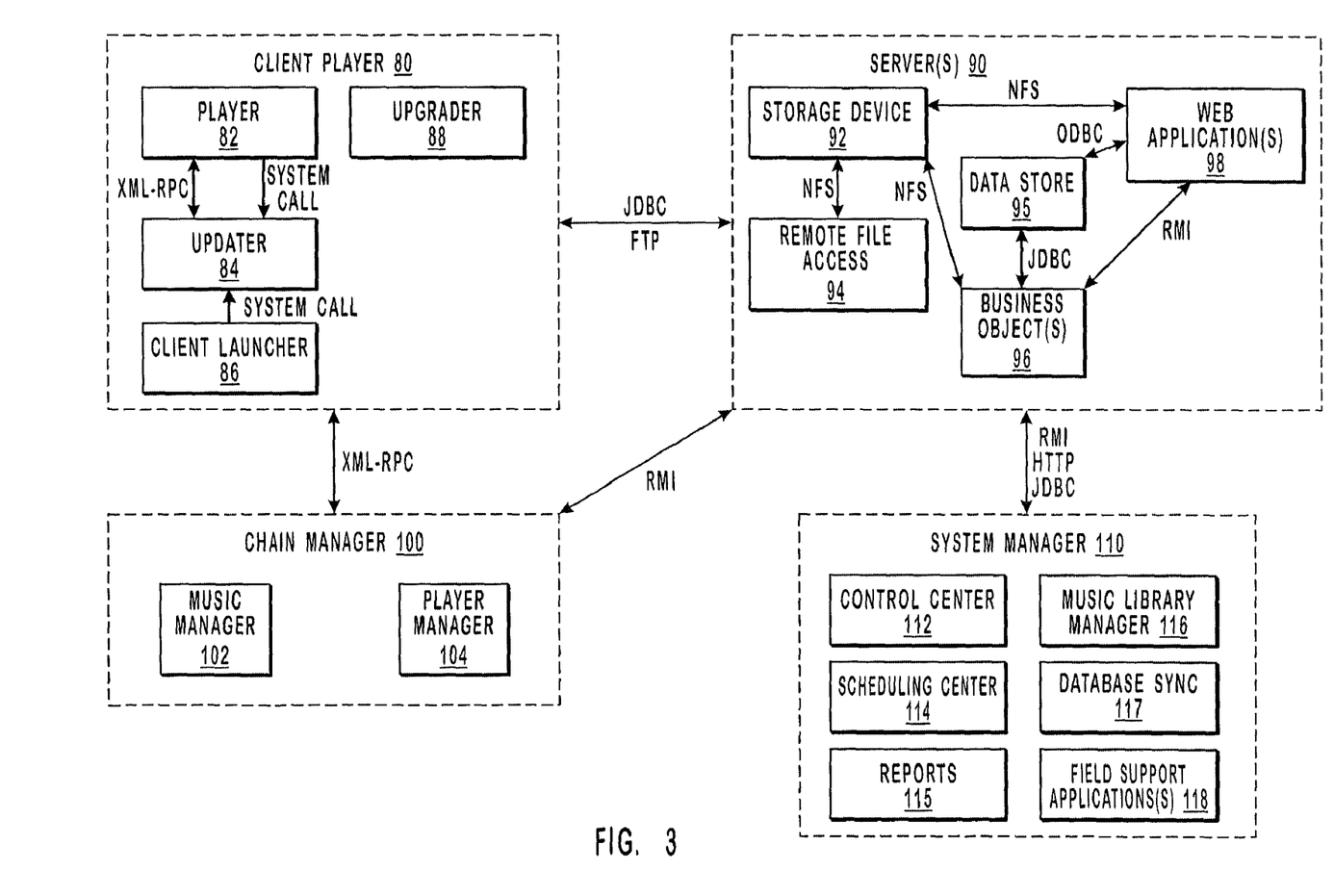
FIG. 3 illustrates a representative system configuration that may be used in accordance with an embodiment of the present invention that provides an architecture and interface for delivering customizable music and advertisements to remote retail locations.

FIG. 3 illustrates a representative system configuration that may be used in accordance with an embodiment of the present invention to provide an architecture and interface for delivering customizable music and advertisements to remote retail locations. FIG. 3 includes four components, namely client player 80, one or more servers 90, a chain manager 100, and a system manager 110.

In one embodiment, servers 90 include application and database servers and file storage devices to manage one or more resources. Servers 90 communicate with the other components of the framework using Java Database Connectivity (hereinafter "JDBC," which is a application program interface that enables Java programs to access database information and translates data queries into commands that the database management system understands), File Transfer Protocol (hereinafter "FTP," which is a protocol used in association with the Internet for sending files), Remote Method Invocation (hereinafter "RMI," which is a set of protocols developed for Java objects that enables the protocols to communicate remotely with other Java objects), and Hypertext Transfer Protocol (hereinafter "HTTP").

Client player 80 includes applications that run on client computers located in remote locations, such as in particular stores of a retail chain. The applications play and log in-store music and advertisements, connect to the server(s) 90 for updates, and upgrade software and music on the client. Client player 80 communicates with servers 90, for example, using JDBC and FTP. Further, client player communicates with chain manager 100 using Extensible Markup Language-Remote Procedure Call (hereinafter "XML-RPC," which is a protocol that allows a program on one computer to execute a program on a server computer, wherein a client program sends an Extensible Markup Language (XML) message to the server with appropriate arguments and the server returns a message containing the results of the program executed). In one embodiment, client player is a headless computer device.

Communication between client player 80 and server 90 is based on the TCP/IP protocol. Embodiments of the present invention embrace a variety of configurations for communication between a client player and a server. For example, in one embodiment, a client player and server communicate via the public Internet. In another embodiment, a client player and server communicate via a direct network connection. In yet another embodiment, a client player and server communicate via a dial-up connection. Those skilled in the art will appreciate that embodiments of the present invention embrace a variety of different communication configurations to enable a plurality of client player computer devices to communicate with one or more servers.

System manager 110 includes a suite of tools developed to automate business functions, such as creating and modifying contracts, advertisements, and schedules. Some applications provide reports to track the status of business functions. System manager 110 communicates with server(s) 90 using RMI, HTTP, and JDBC.

Chain Manager 100 includes a suite of tools developed for use by retail chain personnel or by a manager of a grouping of one or more client players to manage music and control client players. A chain is a grouping or association of locations at which a client player resides. The chain manager provides authority of a representative of a particular chain, grouping, or association of client players to manage the content broadcast at the individual players. In one embodiment, chain manager 100 is a computer device that resides at a nearby location to client player 80. In another embodiment, chain manager 100 resides at a remote location to client player 80. Chain manager 100 communicates with client player 80 using XML-RPC and with server(s) 90 using RMI. Embodiments of the present invention embrace the elimination of chain manager 100, whereby, for example, the functionality and control discussed below in relation with chain manager 100 is performed by system manager 110.

In the illustrated embodiment, server(s) 90 includes storage device 92, remote file access 94, data store 95, business objects 96, and application(s) 98. Storage device 92 includes a computer readable medium having accessible resources and/or files preserved thereon. For example, storage device 92 includes one or more physical storage devices (e.g., hard disk drives, tape drives, and optical disk drives) to hold files (e.g., audio and video files) that are to be provided to a client player computer.

Remote file access 94 includes one or more servers (e.g., an FTP server) to provide a means for transferring files (e.g., audio and video files) to client player 80. In the illustrated embodiment, remote file access component 94 communicates with storage device 92 using a network file system (hereinafter "NFS," which is a client/server application that allows users to access shared files stored on computers of different types through an interface referred to as a virtual file system or VFS that runs on top of TCP/IP protocol).

Business object(s) 96 component comprises a layer that models and enforces business rules and/or data of an organization. For example, it includes the JIMBean components that are discussed below. In the illustrated embodiment, business object(s) 96 communicates with storage device 92 using NFS, with data store 95 using JDBC, and with applications 98 using RMI.

Data store 95 comprises a business data layer that models and enforces business rules and/or data of an organization, and includes music, advertisements, field services, chain, contract, and schedule information. In the illustrated embodiment, data store 95 communicates with business objects 96 using JDBC and with web applications 98 using Open Database Connectivity (hereinafter "ODBC," which is a database access method that makes it possible to access any data from any application, regardless of which database management system is handling the data by translating the application data queries into commands that the database management system understands). In one embodiment, data store 95 comprises flat XML files.

In another embodiment, data store 95 comprises one or more databases, such as an enterprise database, a music library database, and a field services database. Updater 84, control center 112, scheduling center 114, reports 115, database sync 117, field support application 118, and music manager 102, each of which will be discussed below, use information in the enterprise database. Reports 115 and field support application 118, each of which will be discussed below, use information in the field services database. Reports 115 and music manager library 116, each of which will be discussed below, use information in the music library database.

Web applications 98 interact with business information/objects (e.g., stored procedures) to perform functions in the system. For example, web applications 98 include multiple applications that are the web accessible presentation to business objects 96 and data store 95. Those skilled in the art will appreciate that embodiments of the present invention also embrace non-web based applications for use in accordance with the present invention.

Web applications 98 include both web-based reports and applications utilized by non-chain managers to manage business functions (e.g., contract and advertisement management) and to view business information (e.g., connection reports). In the illustrated embodiment, web applications 98 communicate with file storage 92 using NFS, with data store using ODBC, and with business objects 96 using RMI.

In the illustrated embodiment, client player 80 is a computer device that includes player 82, updater 84, client launcher 86, and upgrader 88. Player 82 includes an application that creates a schedule for playing/broadcasting advertisements and media files (including announcements), selectively chooses media files to play/broadcast, plays media files, and logs advertisements and media files that have been played/broadcast along with any errors that occurred. In one embodiment, player 82 includes an XML-RPC server and an audio dynamic range compressor/expander for leveling the volume of media files. Player 82 communicates with updater 84 using XML-RPC and invokes updater 84 via system calls. Player 82 also communicates with player manager 104 of chain manager 100 via XML-RPC.

In one embodiment, player 82 includes a scheduler, a media playback framework, an event log manager, an XML-RPC server, a volume fader, and a dynamic range compressor/expander. In the embodiment, the scheduler selects a media file randomly from weighted genres specified in the playlist in the following manger: (1.) Genres are assigned a range of numbers between 1 and 100 reflecting their weight, for example, if two genres are specified in the playlist with weights of 70 and 30, respectively, the first genre is assigned a range of 1-70 and the second genre is assigned a range of 71-100; (2.) A random number, between 1 and 100, is generated to determine the genre that is selected, therefore in the present example, a random number of 75 would result in the selection of the second genre; and (3.) Media files in the genre folders are marked as either "played" or "not played," and a random number, between 1 and the number of files in the "not played" category, is generated to determine the media file to be selected. Accordingly, a random number of 235 would result in the selection of the 235$^{th}$ file in the genre folder that has a "not played" status.

The scheduler ensures that no two media files of the same artist are played back-to-back. It remembers the name of the artist of the last media file played and will randomly select another file from the "not played" list. It will repeat this process up to three times if it keeps selecting the same artist. The media framework plays the selected file and the file is marked as played so that it will not be played again until all of the files in that genre have played. Accordingly, if any changes are made to the playlist, all files will be reset to "not played".

The scheduler also determines which advertisements need to be played and the determination is performed in the following manner: (1.) The scheduler evenly spaces advertisements throughout the hour, assigning an exact play time for each advertisement; (2.) It determines if an advertisement needs to be played at the completion of each media file that is played, and if one or more of the advertisement play times fall between the time of the current check and the last check, those advertisements are selected for play; and (3.) After the check has been completed the scheduler records the time it performed the check as the "last check". (At startup the "last check" is set as the current time.)

The media framework plays the selected advertisement(s). In a further embodiment, the advertisements do not clean themselves out at the top of the hour, so if an hour is overscheduled, all of the advertisements will play (one right after the other) then a media file will play and the next set of scheduled advertisements will play. The log manager records all media files and advertisements played, along with their associated playback timestamps and any errors that may have occurred.

The XML-RPC server allows an XML-RPC client program to connect to the player and perform certain functions. This connection requires authentication by the client program. The functions supported by the XML-RPC server include retrieving advertisement-played information, viewing scheduled advertisements, stopping scheduled advertisements for a period of time, logging errors, viewing and/or deleting log entries, getting and/or setting a volume level, viewing a list of media files that have played and when they played, skipping a currently playing media file, moving a media file to a different genre, deleting a media file, launching updater 84, starting player 82 if the player is listening for requests, stopping player 82 to leave the player listening for requests, shutting down player 82 so that the player stops listening for requests, shutting down the box (with a reboot if desired), querying the status of player 82, etc.

The Dynamic range compressor/expander is a volume leveler that modifies the output of media files, leaving advertisements in their original state. This provides the functionality to allow advertisements to run a little "hotter" than media files. The volume fader fades the volume of a song after a configurable duration. This provides the functionality to create short music programs.

Updater 84 comprises an application that uploads advertisements played, music versions, and software version information to the server(s) 90, receives new connection times from server(s) 90, gets new playlists from server(s) 90, and downloads any files referenced in the playlists. In the illustrated embodiment, updater 84 communicates with player 82 using XML-RPC and is invoked by player 82 and client launcher 86 via system calls. Updater 84 communicates with remote file access 94 of server(s) 90 via FTP and with data store 95 of server(s) 90 via JDBC.

In a further embodiment, the server calls for updater 84 include open connection, insert connection record, get new connectivity information, upload advertisement-played information from player 82 via an XML-RPC connection, get new playlist information, get a list of advertisements for client player 80 and determine which advertisements need to be downloaded, remove advertisements from client player 80 that are not referenced in the current playlist, downloading advertisements by getting FTP login information, looping through advertisements to download, cleaning up advertisement inconsistencies to ensure that the server knows which advertisements the client player has and to ensure that the server information is consistent with the client information, updating the connection record, closing the connection, and logging any errors that occur.

Client launcher 86 comprises an application that launches updater 84 either at the scheduled time or on demand, and includes connectivity specific programs such as a ring-daemon (which listens for incoming calls), a connection establisher, and an IP address poster. In the illustrated embodiment, client launcher 86 invokes updater 84 via system calls.

In one embodiment, client launcher 86 launches at the connect day and time specified in a configuration file that is selectively updated. Further, client launcher includes the following capabilities for dial-up configurations: First, for every execution of updater 84, client launcher 86 initiates a dial-up connection, handling authentication and addressing, logging errors, and connecting within a configurable time duration. Second, client launcher 86 includes an ability to launch updater 84 on demand. For example, this is accomplished via a ring-daemon that listens for an incoming call, clears the line, and executes updater 84.

Upgrader 88 comprises an application that upgrades software and/or media files on client player 80. In the illustrated embodiment, upgrader 88 does not communicate with any other client player application. In a further embodiment, the application also logs its status, handles error conditions, supports versioning of music and/or software, and will not run an upgrade that is at or below the current version on the system.

Figure 4:
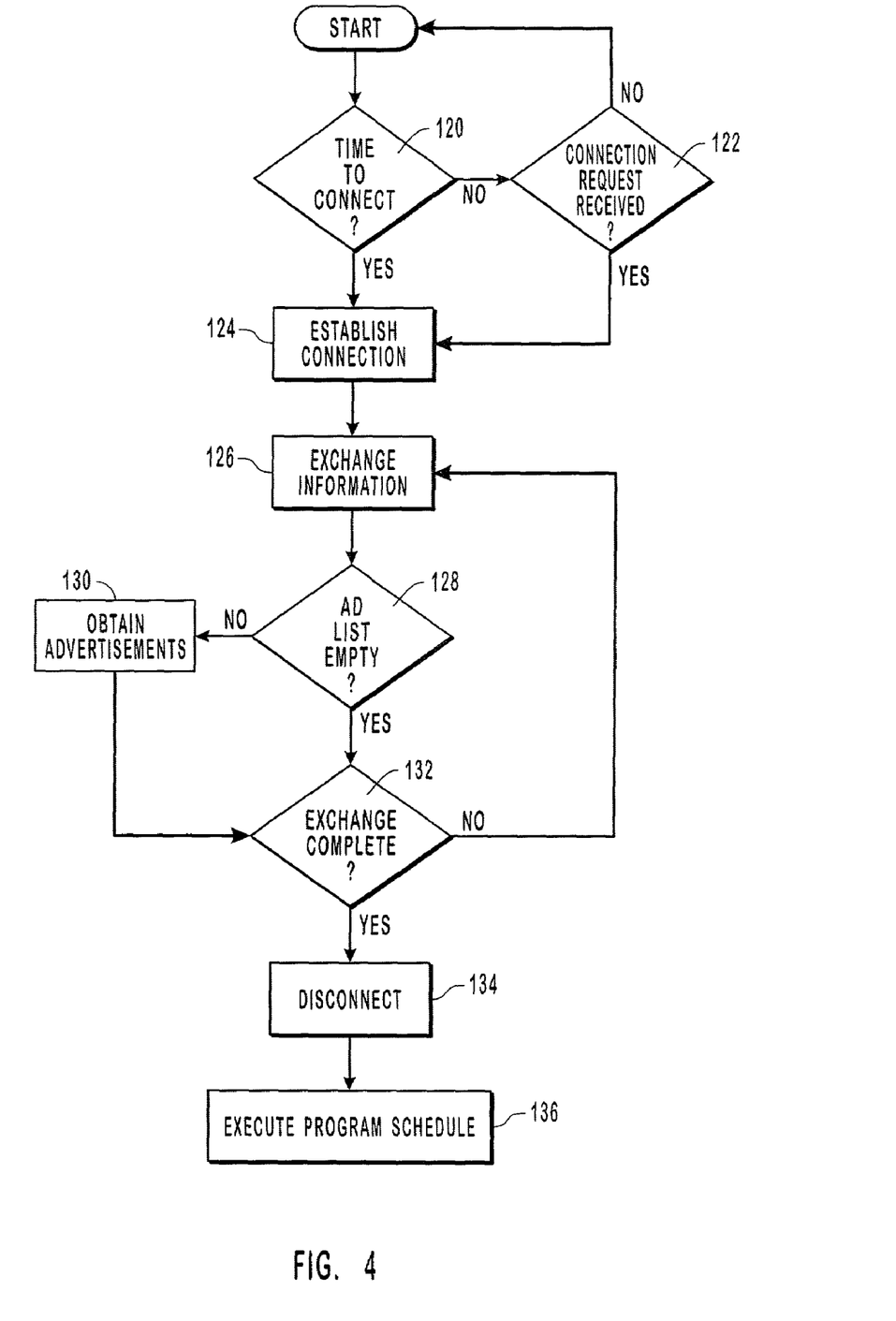
FIG. 4 is a flowchart that provides representative processing at a client player device in accordance with the embodiment of FIG. 3.

With reference now to FIG. 4, a flowchart illustrates representative processing at a client player device, such as client player 80 of FIG. 3, which is performed by a player, and updater, and a client launcher. In FIG. 4, execution begins at decision block 120, where a determination is made as to whether or not it is time to make a connection with the server system. In the present embodiment, the client player device initiates contacts with the server system at predetermined times and if it is determined at decision block 120 that it is not time to make the connection with the server system, execution proceeds to decision block 122 for a determination as to whether or not a connection request has been received.

In one embodiment, the client software includes an on-demand application for dialup. Accordingly, a technician calls the phone number associated with the client (e.g., a Linux box) and then hangs up. The modem monitor hears the call, clears the line, and dials into the ISP to establish a connection to the Internet. Through this Internet connection, the IBN server is contacted and the client's IP address is posted. After processing is completed, the technician can use the IP address to connect to the client box if necessary. Thus, if it is determined at decision block 122 that a connection request has not been received, execution returns back to start. However, if it is determined at decision block 122 that a connection request has been received, execution proceeds to step 124.

Returning back to decision block 120, if it is determined that it is time to make a connection with the server system, execution proceeds to step 124, where the connection is established between the client player device and the server system. At step 126, information is exchanged. The exchanged information may include, for example, reports as to when and what was broadcast at the client, desired playlists, and other useful information. Accordingly, the exchanged information may be from the client to the server system and/or from the server system to the client. Execution then proceeds to decision block 128 for a determination as to whether or not an advertisement list is empty.

In one embodiment, an empty advertisement list exchanged at step 126 indicates that no advertisements are to be obtained at this time. Accordingly, if it is determined at decision block 128 that the advertisement list is empty, execution proceeds directly to decision block 132. However, if the advertisement list is not empty, execution proceeds to step 130 to obtain the advertisements, such as by utilizing an FTP connection. Execution proceeds to decision block 132.

At decision block 132, a determination is made as to whether or not the exchange is complete. If it is determined at decision block 132 that the exchange is complete, execution proceeds to step 134. Alternatively, if it is determined at decision block 132 that the exchange is not complete, execution returns back to step 126 for the exchange of additional information. This process continues until the information exchange is complete. The client then disconnects from the server system at step 134 and the new program schedule is executed by the client at step 136.

With reference back to FIG. 3, the illustrated embodiment also includes system manager 110, which comprises control center 112, scheduling center 114, reports 115, music library manager 116, database sync 117, and field support application(s) 118. A non-chain manager utilizes one or more of these tools to perform the high-level management functions discussed below. Embodiments of the present invention embrace the suite of tools residing on one or more computer devices at one or more locations.

Control center 112 is a tool that creates and maintains chain information, store information, group information, music configuration, user information, advertising category information, and the like. It also manages date and time sensitive music playlists for chains, groups, and stores as well as overseeing user privileges. By way of example, a playlist includes a media component (a music playlist) that specifies one or more music genres, such as country, classic, Christmas, jazz, etc., weighted by a percent for playback at a scheduled dates and times, and an advertising component (an advertisement playlist) that specifies zero or more advertisements for playback at scheduled dates and times. The control center 112 manages the media component of the playlist. Control center 112 communicates with business object(s) 96 of server(s) 90 via RMI.

In one embodiment, the control center includes the capability to create, edit and/or delete music configurations, advertising categories, a contact person or system user, store chains, store groups, stores, a default music playlist, and/or a date/time specific music playlist. Further the control center includes the capability to set user privileges for system users, assign a contact person to a store chain, assign stores to store groups, set the number of times in-store and revenue advertisements play in a store (referred to as "slots"), set the volume level for the client player computer for a specific store, assign a contact person to a store, set connectivity information for a store (either networked or dial-up), and assign stores to a playlist.

Scheduling center 114 is a tool that manages in-store contracts, revenue contracts, business contacts, advertisements, the scheduling of advertisements to contracts, etc. Scheduling center 114 communicates with web application(s) 98 of server(s) 90 via HTTP.

In one embodiment, scheduling center 114 is an application that manages the lifecycle of contracts and advertisements. In relation to contracts, it creates, edits, and submits for approval pending revenue and/or in-store contracts. It also specifies stores, dates, exclusivity, advertising categories, and slots for contracts. Moreover, it resolves conflicts between contracts, views contracts in any status of their lifecycle, approves contracts, activates contracts, and manages sales contacts. In relation to advertisements, it creates, edits, and/or deletes an advertisement placeholder, which includes information relating to a specific advertisement (e.g., advertising category, script, chain). It also uploads an advertisement file to a file server, moves an advertisement through an approval process (i.e., copywriting, editor approval, producer assignment, voice talent, sound engineering, producer approval, and final approval), and manages advertisement files on the file server.

In a further embodiment, scheduling center 114 schedules advertisements to contracts. In particular, it associates advertisements with in-store or revenue contracts, sets logging capabilities for contract advertisements, sets "stop playing" capabilities for contract advertisements, creates an advertisement schedule for a contract (e.g., assigning dates, slots, stores, etc.), checks schedules for conflicts, and views an advertisement schedule for a contract. By way of example, a playlist includes a media component (e.g., a music playlist) and an advertising component (e.g., an advertisement playlist). The scheduling center 114 manages the advertising component of the playlist.

Reports 115 are one or more tools to view business reports, such as connectivity and scheduling reports. Reports 115 communicate with web application(s) 98 of server(s) 90 via HTTP. Examples of reports include connectivity reports, scheduling reports, billing reports, advertisement reports, sales reports, database sync reports, and the like. Connectivity reports include, for example, success update status reports (lists of client player computer devices that have successfully completed their scheduled update), failed update status reports (lists of client player computer devices that have completed a connection to the server but have not completed their schedule update), and failed physical connections reports (lists of client player computer devices that did not connection to the server at the scheduled time). Scheduling reports include, for example, advertisement schedule reports (schedule information for a specific advertisement), store schedule reports (schedule information for a specific store), and the like. Billing reports include, for example, proof-of-play report for in-store and/or revenue advertisements, billing statements and/or invoices for advertising clients, notices of credit card use for advertising clients, etc. Advertisement reports include advertisement frequency reports (e.g., how often an advertisers advertisement was played during a period of time), advertisement summary reports (e.g., summary information for the advertisement, such as the date recorded, the broadcast schedule, any problems, etc.), final approval reports (e.g., a list of advertisements that require final approval), a report of advertisements that were scheduled but were not broadcast, an advertisement schedule report, a revenue advertisement status report (e.g., shows where they are in the advertisement lifecycle), a report of scheduled advertisements by region (e.g., identifying scheduled advertisements by groups), and the like. Sales reports include, for example, salesman reports (identifies contract amounts, commissions due, monies paid, and residuals for each company, sales person, etc.), monthly sales reports (identifying the number of advertisements provided, the various clients, when advertisements were played, how much the clients have paid, the commission for the sales person(s), the percentage of what is left on the store chain, etc.), reports of contracts with no advertisements (identifying the contracts that have no advertisements associated with them), contract drill-down reports (identifying contracts based on a defined criteria with an option to drill-down to the contract detail), etc. Database sync reports include, for example, complete information reports, which display information relating to which stores have complete connection information and other relevant information as a result of the sync.

Music library manager 116 is a tool to create and maintain media files and genre information, to upload media files to related genre folders, and to define music library versions. Music library manager 116 communicates with application(s) 98 of server(s) 90 via HTTP.

In one embodiment, music library manager 116 manages media files and genre classifications by creating, editing, and/or deleting media information, and/or genre information. It also uploads media files into genre folders, removes silent frames from media files, populates header tags for media files, and/or creates music library versions.

Database sync 117 is a tool that is used to synchronize a chain store repository and data store 95. Database sync 117 communicates with business object(s) 96 of server(s) 90 via RMI and with data store 95 of server(s) 90 via JDBC. In one embodiment, database sync 117 updates store information on the enterprise with information from chain databases. On a scheduled basis, the application establishes database connections, locks records, and updates database records in the enterprise databases. It also reports database synchronization status.

Figure 5:
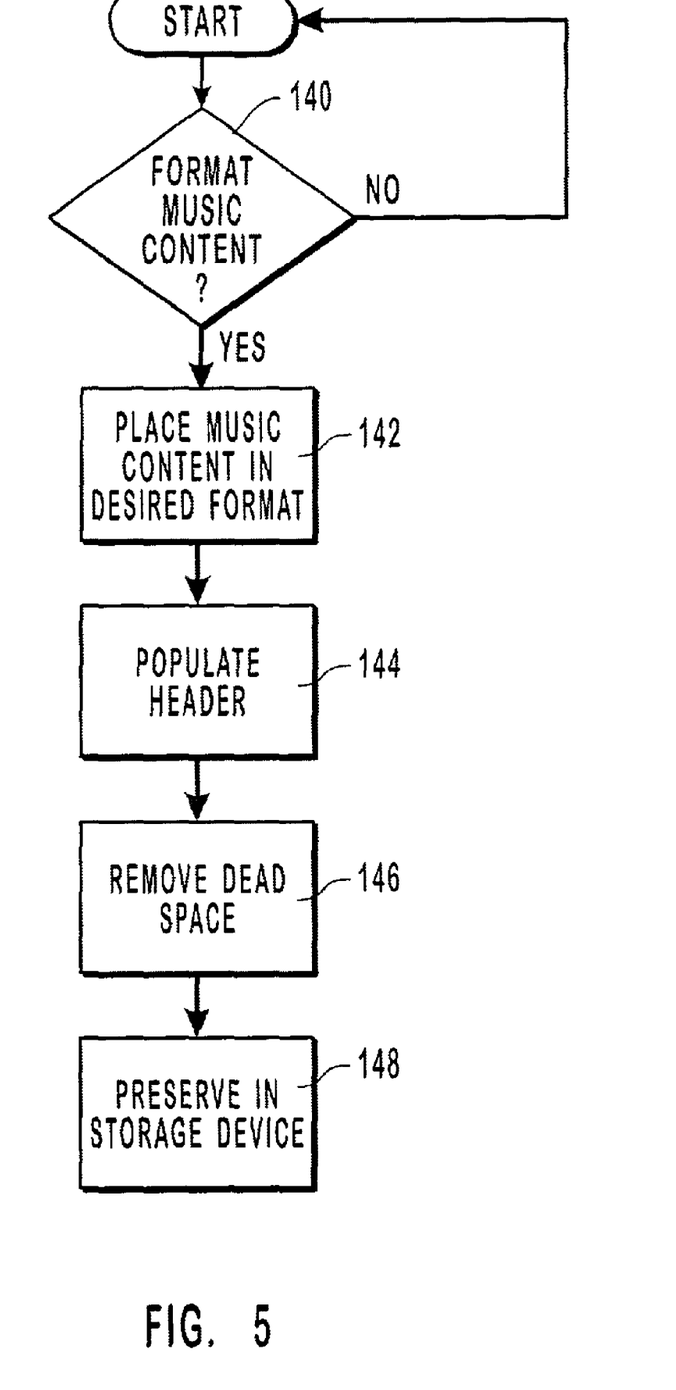
FIG. 5 is a flowchart that provides representative processing at a music library manager in accordance with the embodiment of FIG. 3.

Field support application(s) 118 is a tool to maintain client players, such as client player 80, including viewing reports (e.g., installation histories), managing trouble tickets associated with installations, performing connectivity testing, and the like. Field support application(s) 118 communicates with applications(s) 98 of server(s) 90 via HTTP With reference now to FIGS. 5 and 6, flowcharts are provided to illustrate representative processing respectively performed at music library manager 116 and scheduling center 114. In FIG. 5, execution begins at decision block 140 for a determination as to whether or not to format music content. If it is determined at decision block 140 that music content is not to be formatted, execution returns back to start. Alternatively, if it determined at decision block 140 that music content is to be formatted, execution proceeds to step 142, where the music is placed into a desired format. For example, the music content may be received in a ".wav" format and accordingly is ripped into an MP3 format. At step 144, a header is populated and dead space is removed at step 146. The music content is then preserved at step 148 and execution returns back to start.

Figure 6:
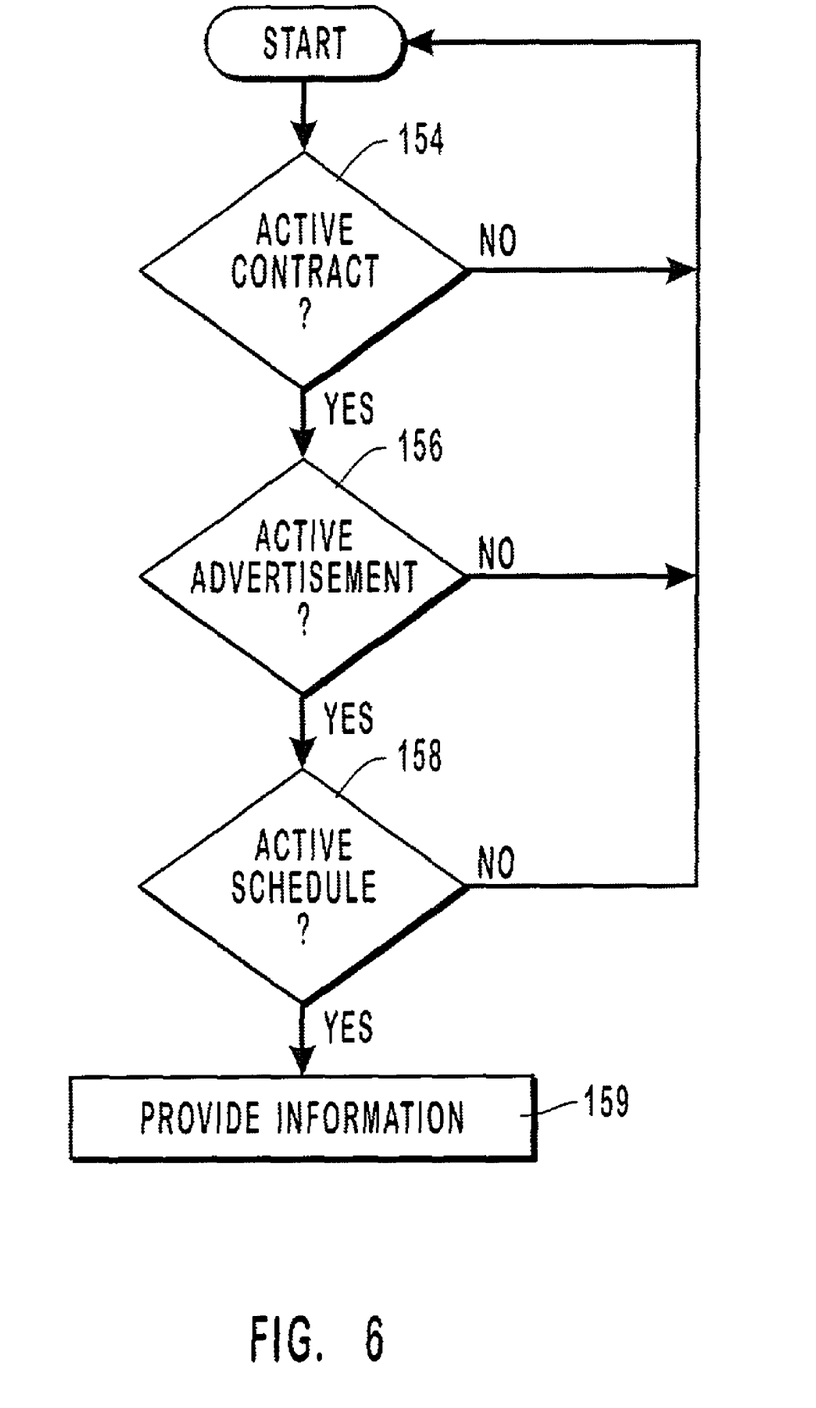
FIG. 6 is a flowchart that provides representative processing at a scheduling center in accordance with the embodiment of FIG. 3.

The scheduling center 114 creates advertising playlists. FIG. 6 displays the process for determining when an advertising playlist is complete and can therefore be transmitted from a server to one or more clients via the updater (84). In FIG. 6, execution begins at decision block 154 for a determination as to whether or not an active contract had been obtained for a particular block of time. If an active contract has not been obtained, execution returns back to start. Alternatively, if an active contract has been obtained, execution proceeds to decision block 156 for a determination as to whether or not an active advertisement corresponding to the contract has been obtained. Thus, if it is determined at decision block 156 that an active advertisement has not been obtained, execution returns back to start.

Alternatively, if it is determined at decision block 156 that an active advertisement corresponding to the active contract of decision block 154 has been obtained, execution proceeds to decision block 158 for a determination as to whether or not an active schedule corresponding to the advertisement and contract has been obtained. If it is determined at decision block 158 that an active schedule has not been obtained, execution returns back to start. However, if it is determined at decision block 158 that an active schedule that corresponds to the advertisement contract has been obtained, execution proceeds to step 159 to allow an advertising playlist to be provided to a client.

With reference back to FIG. 3, the illustrated embodiment also comprises chain manager 100, which includes music manager 102 and player manager 104. Embodiments of the present invention embrace configurations where both the music manager and the player manager reside on the same computer device, or where the music manager and the player manager reside on multiple computer devices. Music manager 102 is a tool that creates and maintains default and date/time sensitive music playlists for groups and stores in a chain, or an association of client players. Music manager 102 communicates with business object(s) 96 of server(s) 90 via RMI. In one embodiment, the music manager is used by an employee of a retail chain or another user to manage playlists by creating, editing and/or deleting a default music playlist and/or a date/time specific music playlist. It further assigns stores to a playlist.

Player manager 104 is a tool that controls specific aspects of a client player, including starting or stopping the player, starting or stopping advertisements, moving or skipping media files, launching the client updater, managing error logs, and/or programming the volume of a broadcast. Player manager 104 further views advertisement and media files that are scheduled to play or have already played. Player manager 104 communicates with player 82 of client player 80 via XML-RPC.

In one embodiment, player manager 104 is used by an employee of a retail chain or another user to manage client player computers by displaying information relating to advertisements played, advertisements scheduled, log entries, songs that have played and when they played, etc. It also allows the user to delete log entries, get and/or set the volume of a broadcast, stop scheduled advertisements, skip a currently playing media file, move a media file to a different genre, delete a media file, launch the updater 84, start player 82 (if the player is listening for requests), stop player 82 (leaving the player to listen for requests), selectively shut down the box with a reboot, query the status of the player, and the like.

Representative Interface Layers of the Application

Figure 7:
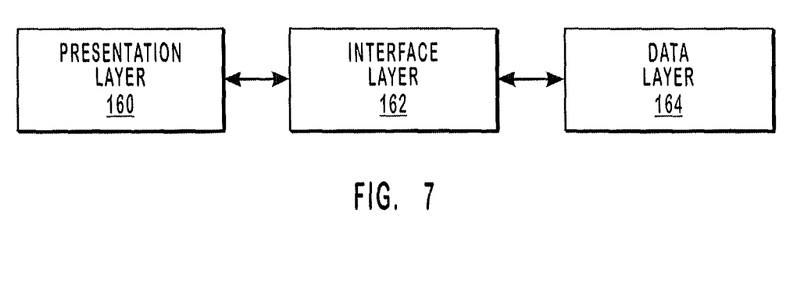
FIG. 7 illustrates a relationship between various layers of a multi-tier enterprise level application in accordance with the present invention.

As provided above, and with reference now to FIG. 7, embodiments of the present invention take place in association with one or more computer devices that are configured to utilize one or more interface layers between a presentation layer 160 and a data layer 164, wherein the interface layer is illustrated as interface layer 162, to provide a multi-tier enterprise level application.

In one embodiment, the business objects (e.g., business objects 96 of FIG. 3) include the use of Persistent and JIMPersistent ("Java Instance Manager") Beans, which facilitate multi-tier applications and do not require the use of an application server. Accordingly, the difficulty associated with designing, coding, and maintaining complex applications is reduced. Persistent Beans assist in the creation and management of business objects without the overhead of Enterprise Java Beans (EJBs), and interact with a database through the use of a peer class that is responsible for creating, restoring, updating, and deleting an object in the database. JIMPersistent Beans add additional functionality, allowing greater control over the distribution and modification of the entities.

FIG. 7 provides the interaction between an interface layer 162 that interfaces between a presentation layer 160 and a data layer 164. By way of example, and with reference back to FIG. 3, JIMBeans serve as the interface layer for the music manager 102, control center 112, and database sync 117.

Figure 8:
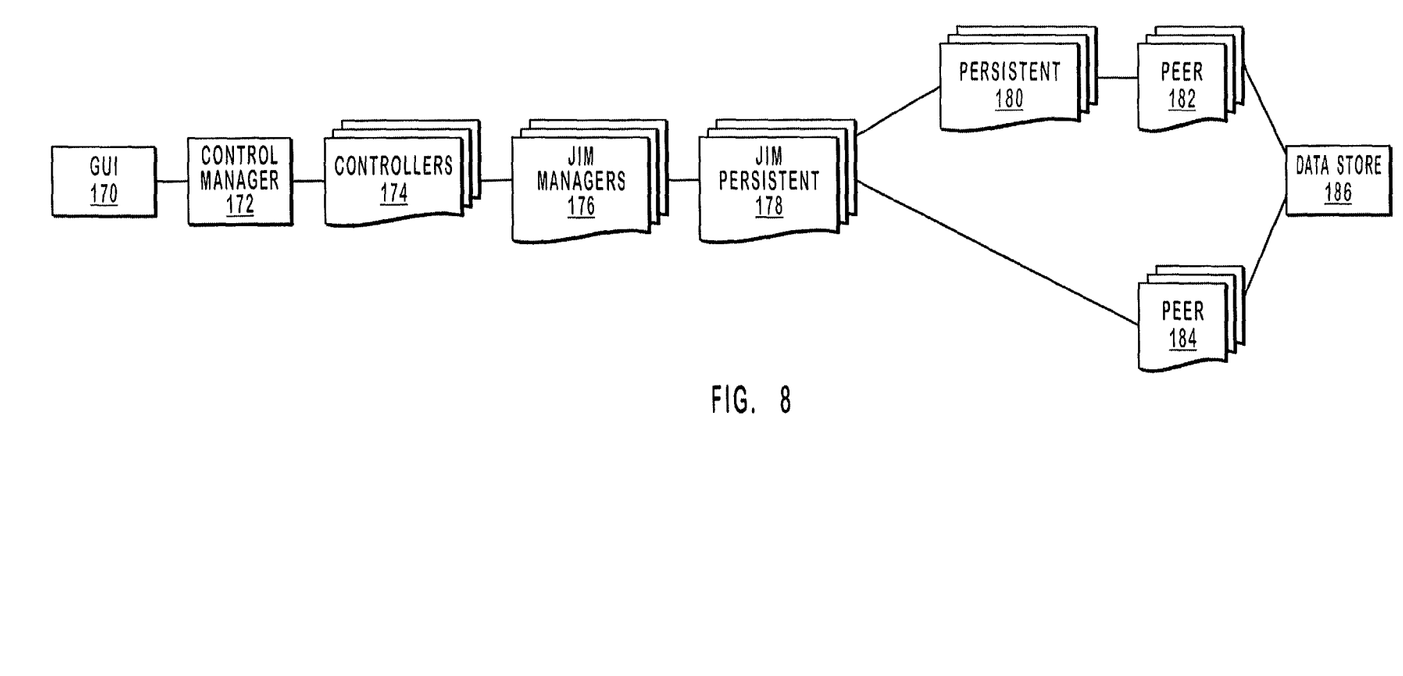
FIG. 8 illustrates a representative interface layer of FIG. 7 that may be used to create or restore database information.
Figure 9:
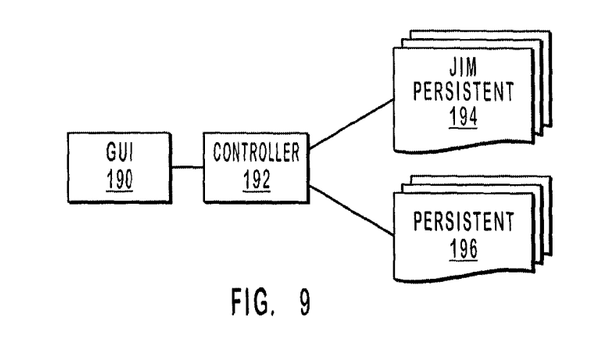
FIG. 9 illustrates a representative interface layer of FIG. 7 that may be used to read database information.
Figure 10:
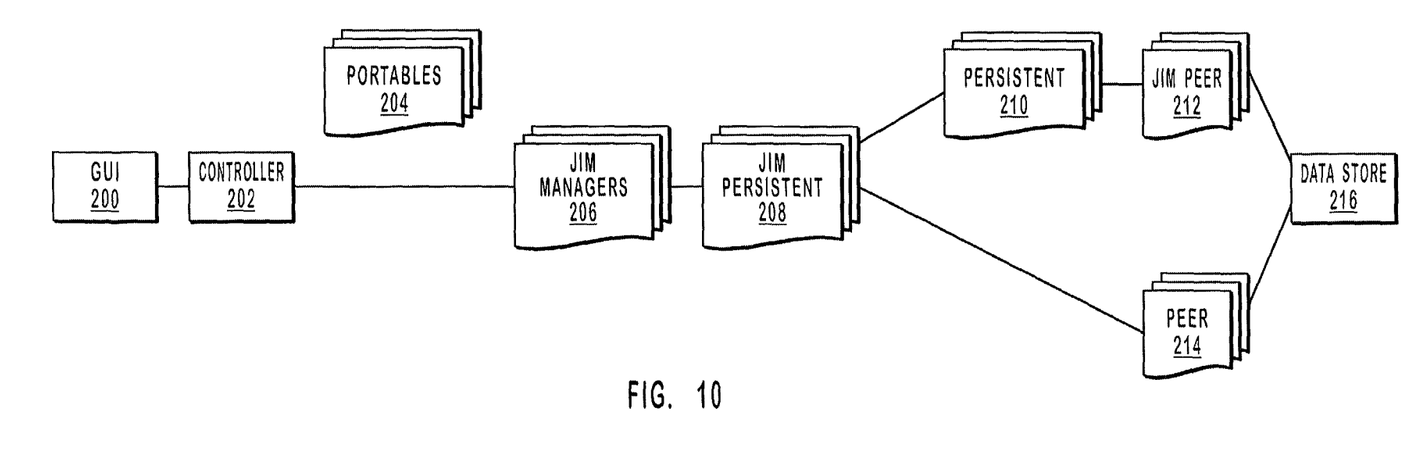
FIG. 10 illustrates a representative interface layer of FIG. 7 that may be used to update or delete database information.

The JIMBean interface layer is displayed in FIGS. 8-10, which include various components such as a controller manager, controllers, object managers, objects, and SQL statements. With reference first to FIG. 8, a representative relationship is provided for the creation or restoration of database information. The GUI 170 makes a request to the controller manager 172, which in turn creates a specific controller 174 needed by the GUI 170. Controller 174 interacts with a JIM manager 176 to create or restore a JIM Persistent object 178 needed. The JIM Persistent object 178 uses an associated JIM Peer 184 to communicate with a data store 186 to create or restore itself in/from data store 186. If the JIM Persistent object 178 includes a reference to a Persistent object 180, then the Persistent object 180 works with its Persistent peer 184 to create or restore itself in/from data store 186.

Accordingly, a controller 174 goes through a JIM Manager 176 so that only one instance of a particular JIM Persistent object 178 exists in memory at a given time, allowing multiple controllers to look at the same instance of an object. This facilitates the fact that if an object is modified, all of the controllers that are using that object are notified of the change. Furthermore, the difference between a JIM Persistent object 178 and a Persistent object 180 is that a JIM Persistent object 178 may exist independently (e.g., it has no parent above it).

FIG. 9 provides a representative relationship for reading database information. The GUI 190 interacts directly with a controller 192 to access and read information from JIM Persistent 194 and Persistent objects 196.

FIG. 10 provides a representative relationship for updating or deleting database information. A GUI 200 interacts directly with a controller 202, which creates a portable object 204 with new values and sends it to the JIM Persistent object's associated JIM manager 206 with a reference to the JIM Persistent object 208 it wants to update or delete. The JIM manager 206 locks the object and performs modifications by telling the JIM Persistent object 208 to update or delete. The JIM Persistent object 208 communicates with its JIM Peer 214, which communicates with a data store 216 to update or delete. If the JIM Persistent object 208 includes a reference to a Persistent object 210, it communicates new values to the Persistent object 210, which communicates with its JIM Peer 212 and the JIM Peer 212 communicates with the data store 216 to update or delete.

Thus, as discussed herein, the embodiments of the present invention embrace systems and methods for providing a multi-tier enterprise level application. In particular, the present invention relates to systems and methods for providing an architecture and interface for delivering customizable music and advertisements to remote retail locations. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system for providing a multi-tier enterprise level application, the system comprising:
   a server centrally located at service provider having audio data comprising music and general advertising;
   a client player comprising a player, updater, client launcher and upgrader, wherein the player comprises an application that creates a schedule for playing and broadcasting advertisements and media files including announcements, selectively chooses media files to play and broadcast, plays media files and logs advertisements and media files that have been played and broadcast along with any errors that have occurred, wherein player communicates with the updater and invokes updater via system calls and wherein player also communicates with a player manager of a chain manager; wherein the client player further comprises player including a scheduler, a media playback landmark, an event log manager, a server, a volume fader, and a dynamic range compressor and expander wherein the scheduler selects a media file randomly from weighted genre specified in a playlist in the following manner:
   (1) genres are assigned a range of numbers between 1 and 100 reflecting their weight;
   (2) a random number, between 1 and 100, is generated to determine the genre that is selected and therefore result in the selection of a second genre, and
   (3) media files in a genre file marked as either "played" or "not played" and a random number between 1 in the number of files in the "not played" category is generated to determine the media file to be selected; wherein the scheduler is structured to ensure that no two media files of the same artist are played back to back by remembering the name of the artist of the last media file played and structured to randomly select another file from the "not played" list figuratively up to three times if random selection continues to select the same artist; and wherein the scheduler is structured to determine which advertisements need to be played wherein the determination is performed in the following manner:
(1) the scheduler evenly spaces advertisements throughout the hour, assigning an exact playtime for each advertisement;
(2) the scheduler determines if an advertisement needs to be played at the completion of each media file that is played and if one or more of the advertisement play times fall between the time of a current check and a last check, and
(3) after a check has been completed, the scheduler records the time it performed the check as the "last check";
a client having local advertising data layer located at a store geographically separated from the server centrally located at service provider for use in providing a broadcast;
an interface layer that selectively interacts with an audio data from the server centrally located at service provider and the audio data from the client to allow each local store to actively modify the data layer at the server centrally located at service provider to create a unique audio program consisting of customized music and customized general advertising, such that control over the audio program is experienced locally at the client and disseminated remotely from the server;
a connection between the server centrally located the service provider and the client which requires authentication by a client program, wherein the centrally located server retrieves advertisements played information, viewing, scheduled advertisements, stopping scheduled advertisements for a period of time, logging errors, viewing and deleting log entries, getting and setting a volume level, viewing a list of media files that have played and when they played, skipping a currently playing media file, moving a media file to a different genre, deleting a media file, launching updater, starting player if player is listening for requests, stopping player to leave the player listening for requests, shutting down player so the player stops listening for requests, shutting down the client player when a reboot is desired and clearing the status of the player;
an updater comprising an application that uploads advertisements played, music versions and software versions information to the client player wherein the updater is structured to receive new connection times from the central server, get new playlists from the central server and download any file preferences and playlists, wherein updater additionally comprises a structure to acquire connectivity information, upload advertisements-played information from player via a connection to central server, acquire new playlist information, get a list of advertisements for client player and determine which advertisements need to be downloaded, remove advertisements from client player that are not referenced in a current playlist, download advertisements through log on information, looping through advertisements to download, cleaning up advertisements inconsistencies to ensure the server knows which advertisements the client player has and to ensure the server information is consistent with the client information, updating the connection record, closing the connection and logging any errors that occur;
a control center structured to create and maintain chain information, store information, group information, music configuration, user information, advertising category information, and structured to manage date and time sensitive music play lists for chains, groups and stores as well as overseeing user privileges and wherein control center is structured to create, edit and delete music configurations, advertising categories, a contact person or system user, store chains, store groups, stores, a default music playlist, and a date and time specific music play list and wherein control center further comprises the capability to set user privileges for system users, assign a contact person to a store chain, assign stores to store groups, set the number of times in store and revenue advertisements played in a store, set the volume level of a client player for a specific store, assign a contact person to a store, set connectivity information for a store and assign stores to a playlist;
a scheduling center structured to manage in store contracts, revenue contracts, business contacts, advertisements, the scheduling of the advertisements to contracts, and wherein the scheduling center is structured to manage the life cycle of contracts and advertisements by creating, editing and submitting it for approval pending revenue and in store contracts, specifically the scheduling center specifies stores, dates, exclusivity, advertising categories and slots for contracts, resolving conflicts between contracts, approved contracts, activate contracts and manages sales contacts effectively creating, editing and deleting an advertisement play folder which includes information relating to a specific advertisement, uploading an advertisement file to a file server, moving an advertisement through an approval process, and managing advertising files on the file server and wherein the scheduling center is structured to schedule advertisements to contracts creating an advertising schedule for contracts, assigning dates, slots and stores, checks schedule for conflicts views an advertisement schedule for a contract and wherein the scheduling center determines when an advertising playlist is complete and structured to transmit complete playlists from the central server to one or more clients via an updater wherein the scheduling center is structured to make a determination as to whether or not an active contract has been obtained for a particular block of time and proceed to determine whether or not an active advertisement corresponding to the contract has been obtained;
a report system structured to communicate with the client player and central server to provide reports including connectivity reports, scheduling reports, billing reports, advertising reports, sales reports, database sync reports;
a music library manager structured to create and maintain media files and genre information, to upload media files to related genre files and assign music library versions in communication with client to player device and the central server; and
a database sync tool structured to synchronize a chain store repository and data store wherein database synch is structured to update store information on the central server with information from chain databases.

2. A system as recited in claim 1, wherein the client comprises at least one of:
   a) a player component structured to broadcast the unique audio program;

b) an updater component structured to send data from the central server to the client;
c) a client launcher component structured to initiate interactions with the centrally located server by the client; and
d) an upgrader component structured to allow the local advertising data layer to be updated.

3. A system as recited in claim 1, wherein the server comprises at least one of:
   a) a storage device;
   b) a remote file access component; and
   c) a business object component.

* * * * *